United States Patent [19]

Isayev

[11] Patent Number: 5,006,403

[45] Date of Patent: Apr. 9, 1991

[54] WHOLLY AROMATIC POLYESTER FIBER-REINFORCED POLY(PHENYLENE OXIDE) AND PROCESS FOR PREPARING SAME

[75] Inventor: Avraam Isayev, Akron, Ohio

[73] Assignee: The University of Akron, Akron, Ohio

[21] Appl. No.: 533,381

[22] Filed: Jun. 5, 1990

Related U.S. Application Data

[63] Continuation-in-part of Ser. No. 344,703, Apr. 28, 1989.

[51] Int. Cl.$^5$ .................... B32B 27/02; B32B 27/04; B32B 27/12; B32B 27/18
[52] U.S. Cl. .................... 428/294; 264/108; 264/177.13; 264/331.21; 264/DIG. 26; 428/364; 428/480; 525/397; 525/437
[58] Field of Search ............... 525/397, 437; 264/108, 264/177.13, 331.21, DIG. 26; 428/294, 364, 480

[56] References Cited

U.S. PATENT DOCUMENTS

| 4,460,735 | 7/1984 | Froix | 525/439 |
| 4,728,698 | 3/1988 | Isayev | 525/434 |
| 4,835,047 | 5/1989 | Isayev | 428/294 |

FOREIGN PATENT DOCUMENTS 0030417 6/1981 European Pat. Off. .

Primary Examiner—James C. Cannon
Attorney, Agent, or Firm—Oldham & Oldham Co.

[57] ABSTRACT

Self-reinforced polymer composites of about 97.5–5% by weight of poly(phenylene oxide) and about 2.5–95% by weight of a melt processable wholly aromatic polyester which exhibt anisotropic properties in the melt phase. This wholly aromatic polyester is a liquid crystal polymer, or LCP. The wholly aromatic polyester is in the form of predominantly unidirectionally oriented continuous fibers primarily in the range of about 1 to 10 micrometers in diameter, distributed in a matrix of poly(phenylene oxide). The polymer composites of this invention have high tensile strength, high modulus, satisfactory elongation, good impact strength, and good high temperature properties.

8 Claims, 2 Drawing Sheets

WHOLLY AROMATIC POLYESTER FIBER-REINFORCED POLY(PHENYLENE OXIDE) AND PROCESS FOR PREPARING SAME

This is a continuation-in-part of Avraam Isayev's copending application Ser. No. 344,703 filed April 28, 1989.

FIELD OF THE INVENTION

This invention relates to self-reinforced polymer composites and processes for making the same, and more particularly to novel self-reinforced polymer composites comprising poly(phenylene oxide)(PPO) and a melt processable wholly aromatic polyester which serves as the reinforcing agent and to processes for making the same.

BACKGROUND ART

Fiber-reinforced polymer composites are well known and widely used. Polymers of improved strength and increased stiffness can be obtained by the use of an appropriate reinforcing fiber. Probably the most widely used reinforcing fibers are glass, carbon and polyamides such as aramid (or "Kevlar" which is a registered trademark of the E. I. du Pont de Nemours & Co., Wilmington, Del.).

The base polymers used in making reinforced polymer composites such as those described above include a wide range of thermoplastics, such as polystyrene and copolymers thereof, polyamides, polycarbonates, polyetherimide, polyether etherketone (PEEK) and polyesters such as polybutylene terephthalate. These polymers are thermoplastics and are either amorphous or semi-crystalline. They may be called flexible chain polymers, since individual monomer units in the polymer chain are free to rotate with respect to each other so that the polymer chain may assume a random shape. By way of illustration, F.N. Cogswell, *Intern. Polymer Processing*, vol. 1, no. 4, pages 157–165 (1987) discloses carbon fiber reinforced PEEK.

More recently developed are self-reinforced polymer composites comprising long, continuous, predominantly unidirectionally oriented fibers of a melt processable wholly aromatic polyester in a matrix of a thermoplastic flexible chain polymer. Such polymer composites are described in commonly assigned, U.S. Pat. No. 4,728,938 of Avraam Isayev et al., issued March 1, 1988. As described therein, the fibers of the wholly aromatic polyester, which may also be termed a thermotropic liquid crystal polymer (LCP) are long continuous fibers formed in situ by mixing the matrix of base polymer with the wholly aromatic polyester in a suitable mixing and extrusion apparatus, as for example, an extruder-static mixer setup, or a twin screw extruder. Polymer composites specifically disclosed therein are polycarbonate/LCP composites containing from 2 to 20 weight percent of LCP, and polyetherimide/LCP composites containing from 5 to 30 percent by weight of LCP.

U.S. Pat. No. 4,835,047 of Avraam Isayev (the inventor herein) and Suresh Swaminathan describes composites of polyetherimide (PEI) and a wholly aromatic polyester or LCP, in which the LCP content varies from 40 to 95 percent by weight. PEI is an amorphous high performance thermoplastic polymer having a glass transition temperature of 215° C. The LCP is present in fibrous domains in a matrix of PEI. Mechanical properties of these composites in general are superior to those described in U.S. Pat. No. 4,728,938 cited supra. These composites of PEI and an LCP are also described in A. I. Isayev and S. Swaminathan, "Thermoplastic Fiber-Reinforced Composites Based on Liquid Crystalline Polymers," *Proceedings of the Third Annual Conference on Advanced Composites*, pages 259–267, 15–17 Sept. 1987, Detroit, Mich., published by ASM International.

DISCLOSURE OF THE INVENTION

Applicant has now found that outstanding physical and mechanical properties are obtained in wholly aromatic polyester fiber-reinforced composites of high performance thermoplastic polymers. This thermoplastic polymer is poly(phenylene oxide).

This invention provides self-reinforced polymer composites comprising (a) from about 5% to about 97.5% by weight, based on total polymer weight, of poly(phenylene oxide) and (b) from about 95% to about 2.5% by weight, based on total polymer weight, of a melt processable wholly aromatic polyester, said polyester being essentially in the form of continuous, predominantly unidirectionally oriented fibers which are formed in situ in a matrix of said poly(phenylene oxide). The amount of wholly aromatic polyester is preferably from about 50% to about 95% by weight, based on total polymer weight. Polymer composites of this invention are characterized as "self-reinforced" because the fibers of wholly aromatic polyester of LCP are formed in situ rather than being added, as is the case with conventional fiber reinforcing materials such as glass and carbon. The LCP polymers are those well known aromatic polyesters such as those described in U.S. Pat. No. 4,728,938 and incorporated herein by reference.

BEST MODE FOR CARRYING OUT THE INVENTION

The required starting materials for preparing the novel polymer composites of this invention are poly(phenylene oxide) and a melt processable wholly aromatic polyester. Novel polymer compositions according to this invention are prepared by mixing from about 5% to about 97.5% by weight of base polymer with from about 95% to about 2.5% by weight of a melt processable wholly aromatic polyester at a temperature at which both polymers are melt processable, extruding the resulting blend in the melt phase, cooling the blend, and recovering a polymer composite according to the invention.

The thermoplastic polymer useful in this invention is poly(phenylene oxide) (PPO). The poly(phenylene oxides) are well known and commercially available, for example the ones supplied by G.E. Plastics as poly(phenylene oxide) 646. The pellets of all material preferably were vacuum dried at 110° C. overnight before being polyblended with LCP.

The polyblends of LCP with PPO may be expressed on a percentage basis as follows, for example: 2.5/97.5 LCP/PPO, 5.0/95.0 LCP/PPO, 10.0/90.0 LCP/PPO, 25.0/75.0 LCP/PPO, 50.0/50.0 LCP/PPO, 75.0/25.0 LCP/PPO, 90.0/10.0 LCP/PPO and 95.0/5.0 LCP/PPO.

These polyblends give composites whose physical properties vary over wide ranges but whose viscosity is less than that of the pure PPO. Impact strength also improves at about 2% to 10% LCP in blends with PPO. The tensile modulus of LCP/PPO blends increases over the whole concentration range of LCP.

The polyester starting materials are melt processable wholly aromatic polyesters such as those described in U.S. Pat. Nos. 3,991,014; 4,067,852; 4,083,829; 4,130,545; 4,161,470; 4,318,842 and 4,468,364 and in G.W. Calundann et al., "Anisotropic Polymers, Their Synthesis and Properties", reprinted from the Robert A. Welch Conferences on Chemical Research, XXVI Synthetic Polymers, Nov. 15-17, 1982, Houston, Tex., pp. 247-291. The melt processable or thermotropic polyester may also be described as a liquid crystal polymer (LCP) since it exhibits anisotropy even in the melt phase.

The wholly aromatic polyester preferably must be matched or paired with the base polymer so that the two have overlapping processing temperatures. That is, the melting point of the wholly aromatic polyester must be within the melt processing temperature range of the base polymer. Also, the wholly aromatic polyester must have a viscosity lower than that of the base polymer under melt processing conditions (e.g., temperature and shear rate).

One series of particularly suitable polymer compositions or composites according to the present invention are those made from poly(phenylene oxides) as the base polymer and a wholly aromatic polyester thermotropic liquid crystal polymer having a melting point of about 275° C. and supplied by Celanese Research Company, Summit, New Jersey under the designation "Vectra A950". This polymer is believed to consist essentially of about 25-30 mole percent of 6-oxy-2-naphthoyl moieties, as described for example in U.S. Pat. No. 4,161,470 and in example 4 of U.S. Pat. No. 4,468,364.

The amount of wholly aromatic polyester in the final product usually is from about 2.5% to about 95% by weight, preferably from about 2.5% to about 10% and from about 50% to about 95% by weight, based on the combined weight of the base polymer viz. PPO and the wholly aromatic polyester.

The wholly aromatic polyester, or LCP, is preferably incompatible with the base polymer over the entire composition range from 0 to 100 percent LCP. Therefore, the two are present as separate phases in blends. When the percentage of wholly aromatic polyester is as specified above and suitable high strain mixing conditions are used, the wholly aromatic polyester is present in the form of long continuous fibers in a matrix of the base polymer. The term, "high strain mixing conditions" herein includes a combination of shear and elongation.

Surprisingly, continuous fibers of the polyester are formed during mixing of the polyester with the base polymers (i.e., PPO), even at high polyester loadings. For example, even in polymer composites containing 70-85% by weight of wholly aromatic thermotropic polyester and conversely 30-15% by weight of PPO, the product consists essentially of long polyester fibers in a matrix of base polymers, provided that proper mixing conditions are observed. More will be said subsequently about proper mixing conditions.

Additional materials are not required but may be present. Thus, it is within the scope of the invention to prepare a mixed composite polymer by inclusion of an additional reinforcing fiber, such as glass, carbon, or aramid, in addition to the wholly aromatic polyester. The additional reinforcing fiber may be incorporated into either the base polymer or the polyester. The additional reinforcement provided by the additional fiber is not necessary in most cases, but where a very high stiffness (or very high strength) reinforced polymer composite is desired, such can be attained according to the present invention without the high loadings of conventional reinforcing fiber required in presently known conventional polymer/fiber composites.

Other additives, such as pigments and fillers, coupling agents, flame retardants, lubricants, mold release agents, plasticizers and ultraviolet stabilizers, may be mixed with the base polymer and wholly aromatic polyester as desired. The use of such additives is well known in the polymer processing art.

The base polymer and the wholly aromatic polyester are mixed at ambient temperature to form a physical mixture. Any additional ingredients which are desired in the final product may also be mixed in at this time. The physical mixture is then dried under conventional conditions, e.g., at temperatures of about 100° C. to about 150° C. for approximately 6 to 24 hours, in a vacuum oven. The dry blended polymers (and additives, if any) are then thoroughly mixed at a temperature above the melting points of both polymers in a suitable mixing apparatus which will give thorough high strain mixing sufficient to cause fiber formation. The blend may be melt processed at a temperature within the range of about 280° C. to about 350° C.

The mixing apparatus may be, for example, a single screw extruder in series with a suitable static mixer. Other high shear mixing apparatus may also be used. The blend is then extruded in the form of a strand, which upon solidification, may be chopped into pellets.

Preferred mixing apparatus includes an extruder, static mixer and extrusion die through which blends of the base polymer and the liquid crystal polymer are extruded. Good results have been obtained by using a single screw extruder having four (4) heating sections in series with a heated six-element Koch mixer (a static mixer), with an adapter between the extruder and the Koch mixer, and a discharge die having a 1/16 inch (in diameter) opening on the outlet side of the Koch mixer. The processing temperature is the temperature at which both polymers are melt processable, i.e., a temperature at which the base polymer is either melted or sufficiently soft to be processed in ordinary mixing apparatus and at which the wholly aromatic polyester is above its melting point. The ingredients are brought up to processing temperature at the beginning of the mixing operation and are thereafter maintained in the desired temperature range. In the case of the preferred apparatus, the ingredients are brought up to temperature near the feed end of the single screw extruder and are thereafter maintained at appropriate processing temperature by appropriate controls of the various independently adjustable heating sections.

The product polymer composition or blend is a self-reinforced polymer composite in which PPO is the matrix and the wholly aromatic polyester is in the form of predominantly unidirectionally oriented long continuous fibers or strands, oriented in the direction of extrusion. Fiber diameters are predominantly less than 10 microns, primarily in the range of about 1 micron to about 10 microns, although fibers of other diameters can be obtained. The polymer composite is characterized as self-reinforced because the wholly aromatic fibers are formed in situ during the mixing process rather than being fed to the mixing apparatus as solid fibers. The proportions of ingredients in the polymer composite are essentially the same as in the feed.

The product polymer composite may be further processed as desired. For example, the polymer composite may be pelletized and then formed into shaped articles, tapes, films or fibers. This shaping may be accomplished by conventional means such as extrusion, injection molding, etc. Molded composite articles may be formed by injection molding. Films may be formed by conventional means such as melt extrusion or casting. Fibers may be formed by conventional melt spinning techniques. Polymer composites of this invention are especially suitable for injection molding.

Products of the present invention exhibit exceptional mechanical properties, including tensile modulus, tensile strength and notched Izod impact strength. Mechanical properties, especially tensile modulus and tensile strength, are significantly higher than those of the polyetherimide/wholly aromatic polyester composites described in U.S. Pat. No. 4,728,938, in which the amount of wholly aromatic polyester may range from 5% to about 30% by weight, based on total polymer weight. Tensile properties of composites based on PPO and those based on polyetherimide (PEI) are similar. Impact properties of composites of this invention are superior to those of composites based on PEI. Mechanical properties of the present polymer composites, for the most part, are well above the values which would be predicted from the Rule of Mixtures. The discussion of the Rule of Mixtures can be found in Lawrence E. Nielsen, "Mechanical Properties of Polymers and Composites," vol. 2, Marcel Dekker, Inc., New York 1974; pages 455 and 465 are of particular interest. Also surprising and unexpected is the fact that PPO/wholly aromatic polyester blends of this invention are in the form of composites in which the wholly aromatic polyester is in the form of long, continuous, predominantly unidirectionally oriented fibers. Blends of polycarbonate with the same wholly aromatic polyesters did not exhibit a fiber structure even at 25% by weight of the wholly aromatic polyester.

Composites of the present invention are anisotropic. That is, they exhibit better tensile properties, e.g., higher secant modulus, higher tensile strength and greater elongation in the fiber or flow direction than they do in the transverse or cross direction. Tensile properties of composites of this invention are much improved over those of the unreinforced base polymer in the fiber direction. Differences in the cross direction are less notable.

Polymer composites of this invention are also characterized by high heat resistance and good electrical properties which remain stable over a wide range of temperatures and frequencies. Polymer composites of this invention also have good flame resistance.

Polymer composites of this invention are especially useful in high performance applications where high tensile strength, high modulus and good impact resistance are required or at least highly desirable. These products are particularly useful in various electrical, electronics, aerospace and automotive applications. In particular, polymer composites of this invention are useful in automotive and aerospace applications as replacements for present composite components which are produced by sheet molding compound technology. Products of this invention can be produced at faster rates and with less power consumption, resulting in lower product costs, compared to conventional composites in which fibers are prepared in advance. The additional step involving fiber preparation, the cost of machinery and the time required to prepare fibers are avoided.

Self-reinforced polymer compositions having a high degree of toughness (which is measured by the Izod impact test) can be obtained. Polymer composites of this invention are appreciably tougher than the corresponding base polymer.

This invention will now be further described in detail with reference to the specific examples that follows. It will be understood that these examples are by way of illustration of the invention and not by way of limitation of the scope thereof.

The melt processable wholly aromatic polyester used in the examples was a thermotropic polymer supplied by the Celanese Research Company, Summit, New Jersey under the designation "Vectra A950". This polymer has a melting point of 275° C. and is believed to consist essentially of about 25–30 mole percent of 6-oxy-2-naphthoyl moieties and 70–75 mole percent of p-oxybenzoyl moieties.

EXAMPLE 1

Mixtures of poly(phenylene oxide) and wholly aromatic polyester ("Vectra A950")(LCP) were prepared by dry mixing pellets of the two polymers at ambient temperature to form a physical mixture, and drying this mixture at 100° C. for 24 hours in a vacuum oven. Compositions ranged from 100 percent PPO to 100 percent LCP. (Blends ranged in composition from 2.5% to 90% LCP by weight.) The dried and blended pellets were fed to a static mixer apparatus which comprised, in series from inlet to outlet, a ¾" Killion single screw extruder (screw L/D 24:1) driven by a one horsepower motor, a 6-element Koch Model No. KMB-150 static mixer, and a 1/16 inch (in diameter) discharge die, with transition sections between the extruder and the static mixer and between the static mixer and the die. The screw extruder had three temperature zones, with Zone 1 being at the feed section and Zone 3 at the screw tip. The temperature of Zone 1 was controlled at 282° C. whereas the other two zones were kept at 310° C. The Koch static mixer temperature was controlled by four temperature controllers, all maintained at 310° C. The screw extruder was operated at 30 RPM. As the blend exited the static mixer, it was cooled in a room temperature water bath located just after the exit region. The solidified extrudate was cut into pellets approximately 4 mm in length with a pelletizer.

These pellets were then fed to a BOY 15S reciprocating screw injection molding machine with a maximum shot size of 36 cm³. The following process conditions were used for molding:

| Barrel temperature All Zones | 330° C. |
|---|---|
| Nozzle temperature setting | 100% |
| Mold temperature | 150° C. |
| Clamping force | 24 tons |
| Injection pressure | 2000 psi |
| Back pressure | 0 psi |
| Cycle time | 30 sec. |
| Screw speed | 150 rpm |

Samples of the injection molded blends described herein were observed in a Scanning Electron Microscope (SEM) model ISI-SX-40 (International Scientific Instruments) and were found to be in the form of fibers of predominantly 1 to 10 microns in diameter. These fibers were oriented essentially in the direction of molding, were well distributed across the surface of the material, and were nearly continuous in length.

Injection molded samples of each polymer blend were subjected to impact and stress-strain tensile tests.

Impact tests were carried out according to ASTM method D 235 C, using dumbbell shaped samples (standard tensile bars) 6.3 cm in length and having notches 0.125 inch (about 0.32 cm) in width, and using 2.0 lb and 5.0 lb. pendulums.

Tensile properties, i.e., tensile modulus (in gigapascals, or GPa), tensile strength (in megapascals, or MPa) and elongation to break (percentage based on original length) were measured on a Monsanto tensile tester (Model T-500) with a crosshead speed of 5 mm/min. The test specimens were mini-tensile bars. The tensile modulus was measured at 1% strain and tensile strength was measured at maximum stress.

Results are given in FIGS. 1-4 below. The physical properties of these blends are graphed and shown as the graphs of the figures.

Figure 1:
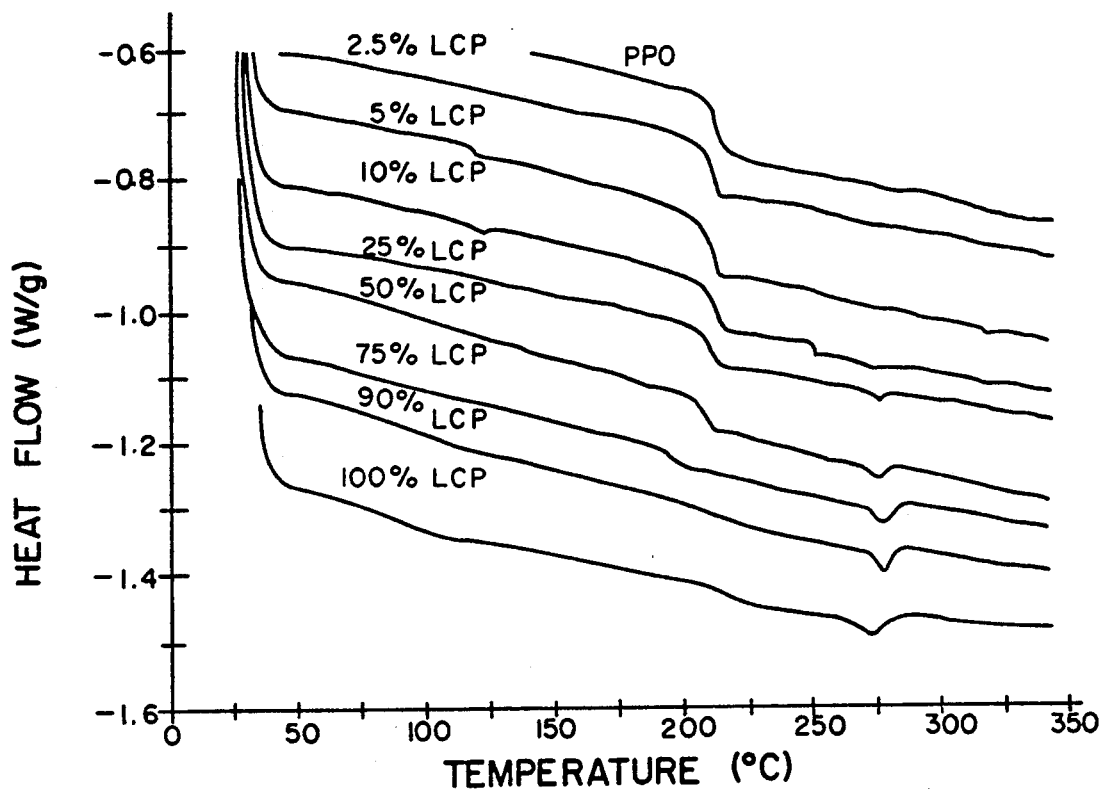
FIG. 1 is a graph of heat flow as a function of temperature obtained using differential scanning colorimeter (DSC).
Figure 2:
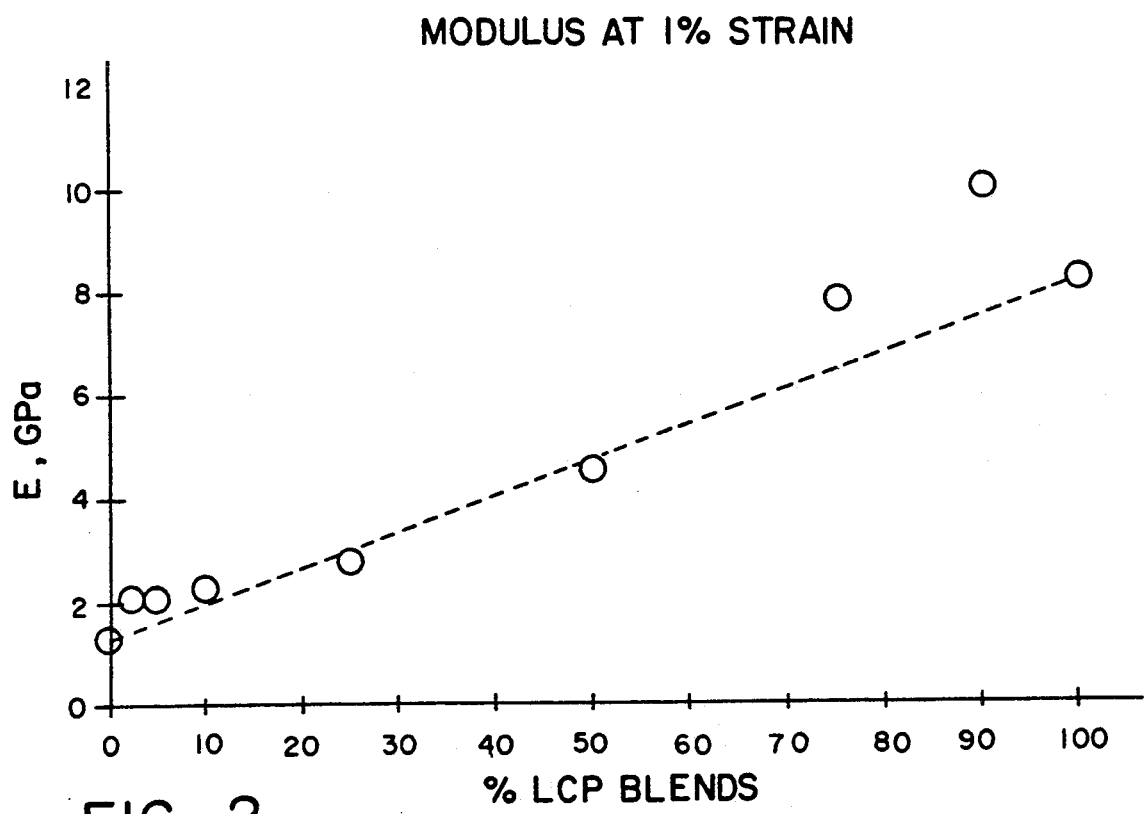
FIG. 2 is a graph of modulus as a function of LCP composition for PPO/LCP blends obtained using a tensile tester with discontinuous lines being drawn according to the rule of mixtures.
Figure 3:
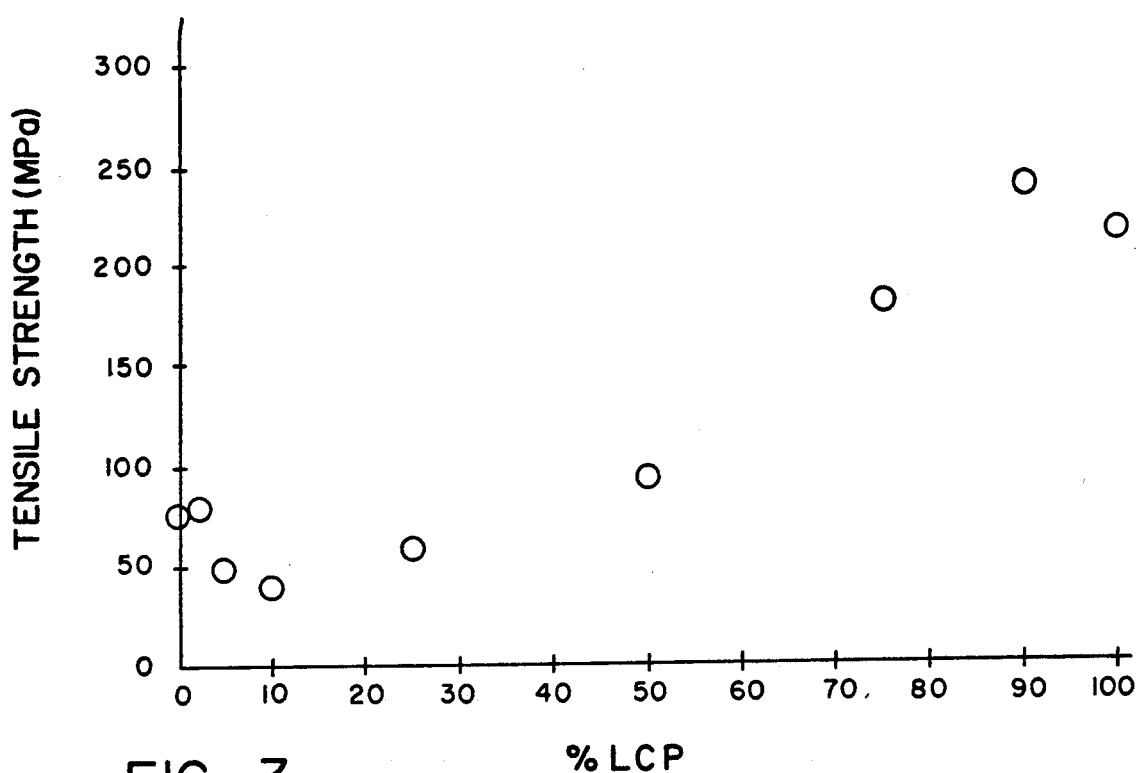
FIG. 3 is a graph of tensile strength as a function of composition for PPO/LCP blends obtained using a tensile machine.
Figure 4:
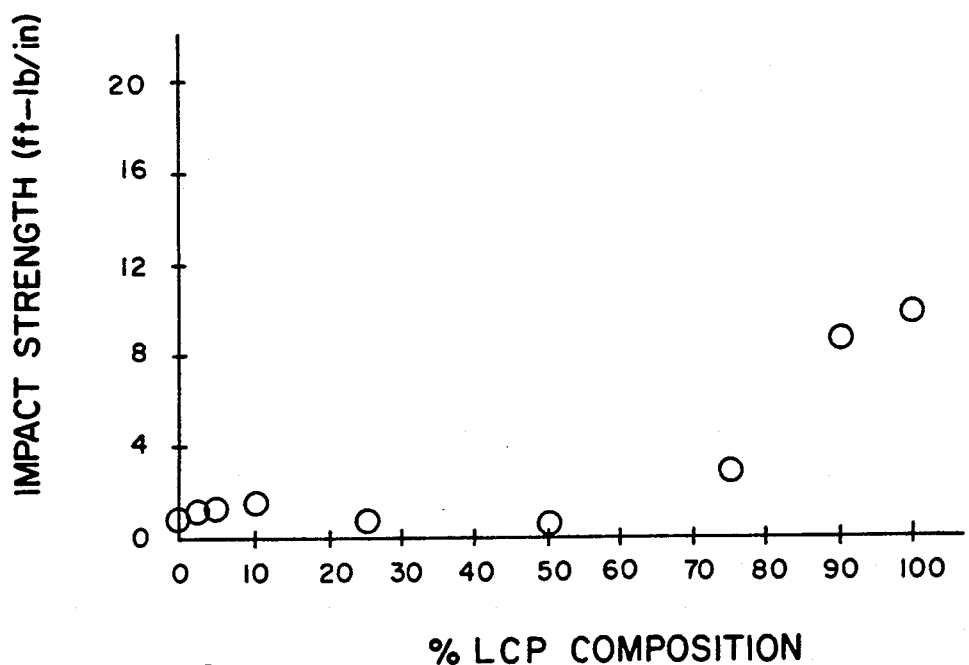
FIG. 4 is a graph of impact strength as a function of LCP composition for PPO/LCP blends obtained using an Izod impact tester.

While in accordance with the patent statutes, a preferred embodiment and best mode has been presented, the scope of the invention is not limited thereto, but rather is measured by the scope of the attached claims.

What is claimed is:

1. A self-reinforced polymer composite comprising:
   (a) from about 97.5% to about 5% by weight, based on a total polymer weight, of thermoplastic poly(phenylene oxide), and
   (b) from about 2.5% to about 95% by weight, based on total polymer weight, of a melt processable wholly aromatic polyester;
   said polyester being essentially in the form of continuous, predominantly unidirectionally oriented fibers which are formed in situ in a matrix of said thermoplastic poly(phenylene oxide) polymer.

2. A polymer composite according to claim 1 comprising from about 97.5% to about 90% by weight of said poly(phenylene oxide) and from about 2.5% to about 10% by weight of said wholly aromatic polyester, based on total polymer weight.

3. A molded composite article formed from the polymer composite of claim 1.

4. A fiber which has been melt spun from the polymer composite of claim 1.

5. A film or tape formed from the polymer composite of claim 1.

6. A process for preparing a self-reinforced polymer composite comprising (1) thermoplastic poly(phenylene oxide) and (2) a melt processable wholly aromatic polyester, which comprises mixing said poly(phenylene oxide) with from about 2.5% to about 95% by weight, based on total polymer weight, of said melt processable wholly aromatic polyester at a temperature at which both polymers are melt processable, and under mixing conditions effective to give, on cooling, a polymer composite in which the wholly aromatic polyester is present in the form of predominantly unidirectionally oriented fibers in a matrix of said thermoplastic poly(phenylene oxide) polymer, extruding the resulting blend in the melt phase, cooling the blend and recovering a self-reinforced polymer composite comprising said poly(phenylene oxide) and said wholly aromatic polyester being in the form of continuous predominantly unidirectionally oriented fibers in a matrix of said poly(phenylene oxide).

7. A process according to claim 6 in which said wholly aromatic polyester is anisotropic in the melt phase.

8. A process according to claim 6 in which the mixing temperature of said poly(phenylene oxide) and said wholly aromatic polyester is from about 280° to about 350° C.

* * * * *